United States Patent [19]

Franklin et al.

[11] Patent Number: 4,942,053
[45] Date of Patent: Jul. 17, 1990

[54] VACUUM CHILLING FOR PROCESSING MEAT

[75] Inventors: Daniel L. Franklin; Arthur J. Goembel; Douglas D. Hahn, all of Austin, Minn.

[73] Assignee: Geo. A. Hormel & Company, Austin, Minn.

[21] Appl. No.: 382,105

[22] Filed: Jul. 19, 1989

[51] Int. Cl.$^5$ .............................................. A23B 4/00
[52] U.S. Cl. ...................................... 426/524; 62/100; 426/519
[58] Field of Search ................... 426/519, 524; 99/472; 366/139; 62/100, 268; 17/25

[56] References Cited

U.S. PATENT DOCUMENTS

| | | | |
|---|---|---|---|
| 2,304,192 | 12/1942 | Newton | 62/1 |
| 2,621,492 | 12/1952 | Beardsley et al. | 62/100 |
| 2,634,590 | 4/1953 | Beardsley | 426/524 |
| 2,634,591 | 4/1953 | Beardsley | 62/100 |
| 2,699,048 | 1/1955 | Brunsing | 62/100 |
| 2,786,342 | 3/1957 | Goetz | 62/268 |
| 2,832,690 | 4/1958 | Brunsing et al. | 62/100 |
| 2,886,858 | 5/1959 | Goetz | 62/100 |
| 2,963,876 | 12/1960 | Hibbs, Jr. | 62/173 |
| 2,996,898 | 8/1961 | Hosken et al. | 62/268 |
| 3,067,588 | 12/1962 | Whitmore | 62/268 |
| 3,128,606 | 4/1964 | Watson | 62/100 |
| 3,149,477 | 9/1964 | Bivins | 62/268 |
| 3,162,020 | 12/1964 | Beckmann | 62/268 |
| 3,304,733 | 2/1967 | Coffman | 426/524 |
| 3,423,950 | 1/1969 | Reynolds | 62/100 |
| 3,786,652 | 1/1974 | Bolynn | 62/243 |
| 3,844,132 | 10/1974 | Miller et al. | 62/268 |
| 4,115,596 | 9/1978 | Knutrud | 426/524 |
| 4,204,408 | 5/1980 | Dawson | 62/100 |
| 4,331,690 | 5/1986 | Bradshaw | 426/524 |
| 4,409,704 | 10/1983 | Seiffhart | 17/45 |
| 4,446,779 | 5/1984 | Hubbard et al. | 99/472 |
| 4,576,014 | 3/1986 | Miller et al. | 62/268 |
| 4,615,178 | 10/1986 | Radenhop | 62/100 |

OTHER PUBLICATIONS

Tumbling and Massaging Revisited by Prof. Robert Rust and Dr. Dennis Olson.

*Primary Examiner*—George Yeung
*Attorney, Agent, or Firm*—Merchant, Gould, Smith, Edell, Welter & Schmidt

[57] ABSTRACT

The invention is a process for processing and treating the meat, and preferably, the muscles of swine, the muscles having water contained in themselves. The muscles are placed in a container 11 having an inner cavity. A vacuum is created by means of a plurality of vacuum pumps 19, 20 and 22. The vacuum being sufficient to lower, in the interior cavity, the temperature at which water boils so that water in the meat boils. The meat is agitated by tumbling in the container 11. The vapor inside of the cavity is exhausted and both cooling and massaging of the meat pieces are by means of the vacuum created.

7 Claims, 1 Drawing Sheet

VACUUM CHILLING FOR PROCESSING MEAT

BACKGROUND OF THE INVENTION

1. Field of the Invention

This invention relates generally to the processing of meats and more particularly to the processing of meats using a vacuum to chill the meat.

2. Description of the Prior Art

It is known to process meat, especially ham, by injecting a cure solution into the meat and then placing the meat into a tumbler and processing it while under a vacuum. Because the tumbling action creates heat and it is preferred to keep the meat cool, refrigeration is also added to the tumblers. Such a process for treating meat is disclosed in U.S. Pat. No. 4,409,704. The vacuum being used in the process described in U.S. Pat. No. 4,409,704 is utilized to assist in increasing the rate of myosin release, and is not used to cool the process. Separate refrigeration coils are utilized for that purpose. The external refrigeration sources for such tumblers have usually been either a cryogenic gas such as $CO_2$ or combinations of mechanical refrigeration equipment and a cryogenic gas. These systems have a high initial cost as well as ongoing high overhead costs. In the case of $CO_2$, other problems are incurred such as rapid wear of vacuum components due to formation of corrosive carbonic acid, reduced vacuum during $CO_2$ injection, freezing up of vacuum ports, and a potentially hazardous working environment.

In addition, there are vacuum cooling apparatuses which are used to cool meat by evaporating the water on and in the meat. Such an apparatus is disclosed in U.S. Pat. No. 3,423,950. The apparatus disclosed in U.S. Pat. No. 3,423,950, does not tumble or process the meat as does that in the process disclosed in U.S. Pat. No. 4,409,704. The vacuum used in U.S. Pat. No. 3,423,950 is at a pressure of 4.6 mm. absolute.

While vacuum cooling has been utilized in meat processing, it has not been utilized to date in a tumbler for processing meat. The present invention provides for a tumbler which utilizes the vacuum for cooling as well as to assist in increasing the rate of myosin release. There is no separate source of cooling, other than the vacuum.

SUMMARY OF THE INVENTION

The invention is a process for processing and treating pieces of meat, having water contained therein. The meat is placed inside of a container having an interior cavity. A vacuum is created in the interior cavity of the container. The vacuum is sufficient to lower in the interior cavity the temperature at which water boils so that water in the meat boils off, thereby cooling the meat. The meat pieces are agitated while in the container and the vapor from the interior of the container is exhausted. Both cooling and the massaging of the meat pieces are accomplished by means of the vacuum.

In addition, the invention is a process for processing and treating pieces of meat, the meat having water. The meat is placed in a container having an interior cavity and a vacuum is created in the interior cavity of the container. The vacuum is sufficient to lower in the interior cavity the temperature at which water boils so that water in the meat boils, thereby cooling the pieces of meat in the interior cavity by vaporization of water. The meat pieces are agitated while in the container and the vapor from the interior of the cavity is exhausted.

The invention is a process for processing and treating muscles of swine, the muscles containing water. The muscles are placed in a container having an interior cavity. A vacuum is created in the interior cavity of the container. The vacuum in the container is less than 6.29 Torr and is sufficient to lower the temperature inside the interior cavity to a temperature at which water in the meat boils, thereby cooling the muscles in the interior cavity by vaporization of water. The muscles are then agitated so as to expose various surfaces of the muscles while in the container. The vapor from the interior of the cavity is exhausted. The muscles are massaged by alternately exposing the various surfaces of the muscles to the vacuum by movement of the muscles due to the agitation and moisture retention is increased of the muscles by the combination of the vacuum, temperature and massaging or kneading which includes compression, relaxation and expansion.

DETAILED DESCRIPTION OF THE PREFERRED EMBODIMENT

Figure 1A:
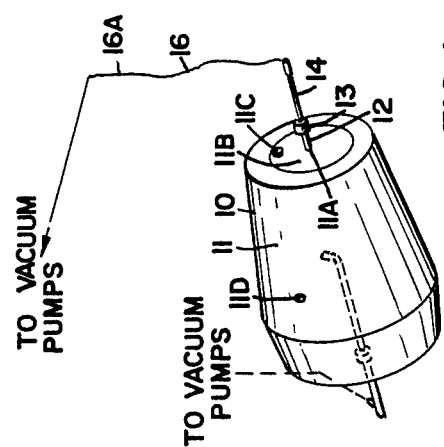
FIGS. 1a and 1b are a perspective view of the vacuum chilled meat tumbler of the present invention.
Figure 1B:
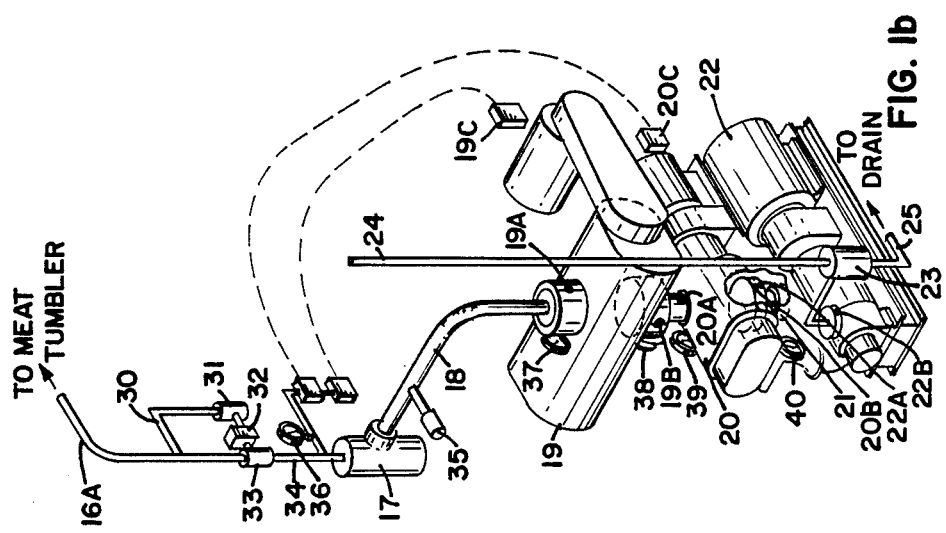

Referring to the figures, wherein like numerals represent like parts throughout the several views, there is generally disclosed at 10 a vacuum cooled tumbler apparatus. The tumbler apparatus includes a meat tumbler 11 such as Challenge/RMF Model MP-10 with a variable speed control. The meat tumbler 11 is equipped with a four inch port 11a for vacuum connection in the door 11b. There is also a port 11c which may be used for measuring the vacuum in the tumbler 11 and a port 11d which may be used for measuring the temperature of the product in the tumbler 11. The four inch vacuum port 11a is fluidly connected with a four inch stainless steel Schedule 40 pipe 12 to a four inch stainless steel rotary joint 13, such as Dover OPW 316 stainless steel No. 3920-04-01. The port 11a and the Schedule 40 pipe 12 are sized to minimize leakage and to assure adequate flow capacity. A second pipe 14 is cooperatively connected to the rotary joint 13 and a stainless steel fitting 15, such as an elbow or tee, is connected to the pipe 14. This enables the direction of the pipe to be changed. A four inch diameter high vacuum hose 16 of sufficient length is connected to the fitting 15. The length is sufficient to allow the door to swing open and close for product handling in and out of the tumbler 11. The hose 16 is cooperatively connected to a pipe 16a. A trap vessel 17 is cooperatively connected to the pipe 16a and the trap is a sufficient size to capture any accidental carry over of material which could exit the tumbler and which would damage the vacuum equipment. Ahead of the trap 17, that is between the trap 17 and the tumbler 11, a pipe 30 is fluidly connected to the pipe 16a and a valve 31 is fluidly connected to the pipe 30. The valve 31 is used to vent the system to the atmosphere and is automatically controlled by controller 32 to close at the beginning of the cycle and to be open on completion of the cycle and shut down of the vacuum pumps. The valve 31 is a ball valve suited for vacuum and has a full port and is normally open. A valve 33 is also fluidly connected in line with the pipe 16a and may be either a ball-type or wafer-type automated valve that is normally closed. The valve 33 is also controlled by the controller 32. When the tumbler cycle starts and the vacuum pumps are turned on, the valve 33 will open allowing the tumbler to be exposed to the vacuum. Valves 31 and 33 are shown as being operated by the same mechanism 32, but could also have independent operating mechanisms. The primary purpose of valve 33 is to insure that the tumbler is vented with clean atmospheric air and not allow venting that would draw impurities through the vacuum pump system that could contaminate product. Optionally, a manual valve 34 may be inserted into pipe 16a for a safety valve. After the trap 17, a valve 35 is fluidly connected to the pipe 18 and is normally opened and closes at the start of the system. At shut down the valve 35 opens, allowing the vacuum pump system to equilibrate to atmospheric conditions. At the discharge of the trap 17, a pipe 18 is cooperatively connected at one end to the trap 17 and at its other end to the first vacuum pump 19. This pipe is of sufficient size to minimize friction and generally will be six inch in diameter Schedule 40 pipe and can be either PVC or metal. The vacuum pump 19 may be any suitable pump which is sized to handle the desired vacuum refrigeration effect at the tumbler 11. One such example is a rotary lobe type unit such as Spencer Model No. RB120 with a 15 horsepower, 1,750 rpm motor. The unit is belt driven and delivers 2,200 cfm at 2 Torr. The pump 19 is controlled by suitable controls such that it starts only after the tumbler vacuum has been reduced to 25 Torr. It can also be cycled on and off during the process in order to achieve the desired control of vacuum and therefore temperature of product within the tumbler 11. A second stage booster vacuum pump 20 is cooperatively connected to the first pump 19 by means well known in the art. This second stage vacuum pump 20 assists in the continued reduction of the vacuum in the tumbler 11. It is sized to complement the first pump 19 such as Spencer Model RB80. This unit is directly coupled to a 10 horsepower, 3,600 rpm motor. The vacuum pump 20 is controlled such that it cannot be started until the tumbler vacuum has been reduced to 100 Torr. Cooperatively connected to the second vacuum pump 20 is a check valve 21. At its other end, the check valve 21 is cooperatively connected to the third vacuum pump 22. The check valve 21 is utilized to prevent moisture from the liquid seal on the third pump 22 from being drawn into the first and second stage pumps 19 and 20 and ultimately is additional protection against product contamination when the vacuum system is shut down. This location provides a maximum protection with the least amount of resistance to the vacuum process. A vacuum gauge 36 is cooperatively connected to the pipe 16a and is used for taking vacuum readings. Also shown in the drawings is a first stage booster starter and second stage booster starter which have vacuum limits which may be adjusted as required. As previously discussed, the first stage booster is set to engage at 100 Torr and the second stage at 25 Torr. Gauges 37, 38, 39 and 40 are all cooperatively connected to the system and may be utilized to check the values of the vacuum.

The third stage vacuum pump 22 is a liquid ring-type pump suitable to handle moisture and non-condensables removed from the product with no damage to the pump components. The pump 22 is sized in accordance with the previous pumps such as a Beach-Russ Model 1306/2C and is directly coupled to a 25 horsepower, 1800 rpm motor. The liquid used for the pump 22 is water and is supplied at 55° F. Excess moisture is discharged through a vent trap 23 where condensate is separated from the air. Air is vented to the outside through the exhaust 24 and the condensate is discharged through a drain pipe 25. The pump 22 is turned on at the initiation of the tumbling cycle and remains on until cycle completion.

The vacuum pumps 19, 20 and 22 are shown mounted in a vertical configuration. This may be done with any suitable support. Alternately, they could be mounted in a horizontal direction. The frame in which they are mounted may be a common frame or if sufficient space is available, separate frames.

Inlet ports 19a, 20a and 22a are located in each of the pumps at their inlet for monitoring and trouble shooting the system. Outlet ports 19b, 20b and 22b are located at the outlet of each vacuum pump 19, 20 and 22 for monitoring and trouble shooting the system.

First stage booster 19c and second stage booster 20c are operatively connected to the pumps 19 and 20 respectively.

To determine the size of the vacuum system necessary to accomplish the vacuum chilling effect, the following calculations are required:

The volumetric mass rate of flow (q) is dependent on the heat generated by the tumbling and massaging action plus heat that must be removed from the product to achieve the desired product temperatures. The equation for mass flow is:

$$q = W \times \frac{359}{M} \times \frac{760}{P} \times \frac{T}{492} \times \frac{1}{60}$$

Ref: PROCESS VACUUM DESIGN & OPERATION by James L. Ryans and Daniel L. Roper
where
q is volumetric mass flow rate in ACFM (Actual Cubic Ft/Min)
W is mass flow rate in lb/hr determined by experiment/ or calculated based on moisture to be evaporated at operating vacuum.
P is absolute pressure in Torr
T is absolute temperature in ° Rankine
M is molecular weight of water
For this system it was determined that W was 33 lb/hr by the following:
Enthalpy of water at 4 Torr is 1075 BTU/lb (Ref: Steam Tables) 20,000 lbs of meat at 41° F. internal temperature reduced to 32° F., which is a 9° change in temperature.
Therefore, heat removal (Q) calculation is:

$$\begin{aligned}
Q &= m \times SpHt \text{ (BTU/lb °F.)} T \\
&= 20{,}000 \times .75 \times 9° = 135{,}000 \text{ BTU} \\
m &= \text{weight of product} \\
SpHT &= \text{specific heat of product} \\
&\quad \text{(in this case .75)}
\end{aligned}$$

the amount of moisture to be evaporated is determined by dividing 135,000 BTU by 1075 BTU/lb (enthalpy) which would be 123.6 lbs.

The heat of mix (determined by test) is 22,000 BTU/hr @ 10 RPM.

Therefore, if the cycle is 10 hours long, 220,000 BTU must be overcome plus 135,000 BTU for cooling, totaling 355,000 BTU. This divided by 1075 BTU/lb (enthalpy of water)=330 lbs of water which must be removed or on the average, 33 lbs water evaporated per hour. This can now be inserted into the volumetric mass flow equation for W.

For M the molecular weight of water is 18.
Tumbler vacuum is 4 Torr.
T is (32°+460)=492°R $$q = 33 \frac{lb}{hr} \times \frac{359}{18} \times \frac{760}{4} \times \frac{492}{492} \times \frac{1}{60} \frac{min}{hr}$$

$$q = 2088 \; ACFM$$

The vacuum system should be sized to eliminate this volumetric mass flow. Piping can be sized based on this flow rate to assure minimum system resistance.

Since the ideal condition is to obtain maximum cooling during initial phase, reducing RPM of tumbler will impart lower heat input. The result is to achieve maximum refrigeration effect at very low tumbling speed. Once the desired cooling has taken place, RPM can be increased to achieve maximum massaging action at desired product temperature. At the end of cycle, allowing vacuum to increase to 6 Torr will essentially stop evaporation and allow heat of tumbling to equilibrate product temperature to a more ideal further processing temperature.

In operation, the tumbler 11 is evacuated to less than 6.29 Torr and preferably in the 3-4 Torr range by the sequential operation of the pumps 19, 20 and 22, as previously described. The 3-4 Torr range brings the boiling point of water to the 24° F. to 29° F. range. The resulting change of state from liquid to gas takes heat from the meat and also carries the heat away from the product as the water leaves the meat, thereby lowering the product temperature. The vacuum also results in raising myosin protein to the surface which improves the product moisture retention, muscle surface cohesion and ultimately finished product quality. Another effect of the high vacuum is that it achieves a substantially improved massaging effect. The tumbler rotation naturally imparts a massaging effect to the product. However, the product on the surface exposed to the vacuum will expand due to the lack of atmospheric pressure. As the product is forced back under the product, the weight of the product will act to compress the product back to its previous physical size. As the tumbler continues to rotate, the product is continually expanded and contracted in this massaging way which also promotes moisture retention and cohesive characteristics.

The most effective way to achieve the above is to effect an initial drawdown of the tumbler along with a tumbler RPM in the 2-4 RPM range, which reduces the product temperature to 29° F. to 30° F. in the shortest amount of time (usually 1-2 hours). Once the product has reached this temperature, it is maintained at this level at a period of sufficient length (usually 2-8 hours) to obtain maximum moisture retention. During this time the tumbler RPM is increased to the 8-10 RPM range. Toward the end of the cycle, the vacuum may be adjusted to a level of 5-6 Torr such that the temperature of the product is allowed to equilibrate to 36° F. to 38° F., a temperature that allows the product to be easily handled in further processing.

Since this system evaporates moisture on a predictable basis, the desired final weight can be achieved by introducing the additional moisture in either the product preparation or at the time of loading the tumbler without altering the product quality.

Examples of this process are as follows:

EXAMPLE 1

Product: Cushion & Flanks (Swine)
Weight In: 12,555 lbs.
Weight Out: 12,223 lbs.
Cycle: 10 Hours

| TIME HR | TEMP °F. | TUMBLER VAC TORR | PUMP VAC TORR | TUMBLER RPM |
|---|---|---|---|---|
| 0 | 39 | 740 | 740 | 3 RPM |
| 0.1 | 39 | 25 | 25 | 3 RPM |
| 0.5 | 38 | 7 | 5 | 3 RPM |
| 1 | 38 | 7 | 4 | 3 RPM |
| 2 | 37 | 6 | 4 | 3 RPM |
| 3 | 37 | 6 | 3 | 10 RPM |
| 4 | 37 | 6 | 4 | 10 RPM |
| 5 | 37 | 4 | 2 | 10 RPM |
| 6 | 37 | 4 | 2 | 10 RPM |
| 7 | 37 | 5 | 2 | 10 RPM |
| 8 | 37 | 5 | 2 | 10 RPM |
| 9 | 37 | 4 | 1 | 10 RPM |
| 10 | 38 | 4 | 2 | 10 RPM |

EXAMPLE 2

Product: Cushion & Flanks (Swine)
Weight In: 14,590 lbs.
Weight Out: 14,302 lbs.
Cycle: 10 Hours

| TIME HR | TEMP °F. | TUMBLER VAC TORR | PUMP VAC TORR | TUMBLER RPM |
|---|---|---|---|---|
| 0 | 37 | 739 | 739 | 3 RPM |
| 0.1 | 36 | 25 | 25 | 3 RPM |
| 0.5 | 35 | 5 | 3 | 3 RPM |
| 1 | 35 | 5 | 2.5 | 3 RPM |
| 2 | 34 | 4 | 2 | 3 RPM |
| 3 | 35 | 4 | 2 | 10 RPM |
| 4 | 35 | 4 | 2 | 10 RPM |
| 5 | 35 | 4 | 2 | 10 RPM |
| 6 | 35 | 4 | 2 | 10 RPM |
| 7 | 36 | 5 | 3 | 10 RPM |
| 8 | 36 | 5 | 3 | 10 RPM |
| 9 | 36 | 4.5 | 2 | 10 RPM |
| 10 | 36 | 4 | 2 | 10 RPM |

EXAMPLE 3

Product: Knuckles (Swine)
Weight In: 5,015 lbs.
Weight Out: 4,851 lbs.
Cycle: 5 Hours

| TIME HR | TEMP °F. | TUMBLER VAC TORR | PUMP VAC TORR | TUMBLER RPM |
|---|---|---|---|---|
| 0 | 39 | 747 | 747 | 3 RPM |
| 0.1 | 39 | 25 | 25 | 3 RPM |
| 1.5 | 39 | 6.5 | 6 | 3 RPM |
| 1.75 | 38 | 8 | 6 | 8 RPM |
| 3.75 | 34 | 5 | 3 | 8 RPM |
| 4.5 | 33 | 4 | 1 | 8 RPM |
| 5.25 | 33 | 2 | 1 | 8 RPM |
| 5.5 | 32 | 4.5 | 3 | 8 RPM |

EXAMPLE 4

Product: Knuckles (Swine)
Weight In: 9,876 lbs.
Weight Out: 9,690 lbs.
Cycle: 5 Hours

| TIME HR | TEMP °F. | TUMBLER VAC TORR | PUMP VAC TORR | TUMBLER RPM |
|---|---|---|---|---|
| 0 | 41 | 743 | 743 | 3 RPM |
| 0.1 | 41 | 25 | 25 | 3 RPM |
| 0.25 | 39 | 8 | 7 | 3 RPM |
| 0.5 | 39 | 7 | 5 | 3 RPM |
| 0.75 | 38 | 6 | 4 | 3 RPM |
| 1 | 37 | 5 | 3 | 8 RPM |
| 2 | 37 | 4 | 2 | 8 RPM |
| 3 | 36 | 2 | 1 | 8 RPM |
| 4 | 35 | 4 | 2 | 8 RPM |
| 5 | 35 | 4 | 1 | 8 RPM |

EXAMPLE 5

Product: Knuckles (Swine)
Weight In: 9,534 lbs.
Weight Out: 9,334 lbs.
Cycle: 5.5 Hours

| TIME HR | TEMP °F. | TUMBLER VAC TORR | PUMP VAC TORR | TUMBLER RPM |
|---|---|---|---|---|
| 0 | 40 | 738 | 738 | 3 RPM |
| 0.1 | 40 | 25 | 25 | 3 RPM |
| 0.5 | 40 | 8 | 3 | 3 RPM |
| 1 | 39 | 6 | 2 | 3 RPM |
| 2 | 38 | 6 | 4 | 8 PRM |
| 3 | 37 | 5 | 2 | 8 RPM |
| 4 | 36.5 | 5 | 3 | 8 RPM |
| 5 | 36 | 4 | 1 | 8 RPM |
| 5.5 | 36 | 5 | 2 | 8 RPM |

EXAMPLE 6

Product: Knuckles (Swine)
Weight In: 4,432 lbs.
Weight Out: 4,305 lbs.
Cycle: 5 Hours

| TIME HR | TEMP °F. | TUMBLER VAC TORR | PUMP VAC TORR | TUMBLER RPM |
|---|---|---|---|---|
| 0 | 42 | 737 | 737 | 3 RPM |
| 0.1 | 41 | 25 | 25 | 3 RPM |
| 0.5 | 38 | 6 | 3 | 3 RPM |
| 1 | 35 | 4 | 3 | 3 RPM |
| 2 | 34 | 4 | 2 | 8 PRM |
| 3 | 33 | 3 | 1 | 8 RPM |
| 4 | 32 | 4 | 2 | 8 RPM |
| 5 | 36 | 10 | 8 | 8 RPM |
| 5.5 | 37 | 11 | 9 | 8 RPM |

After the completion of the cycles, the product is then processed as it would be normally. In the examples, it should be noted that the vacuum reading at the vacuum pump is sometimes less than that of the tumbler. This is due to resistance to the moisture being pulled through the line. Depending upon the length of the line, this could be either increased or decreased.

It is of course understood that other suitable parameters may be utilized during this process to effect the desired results. The rpm of the tumbler and the length of the cycle are dependent upon the amount of product, size of the tumbler and the amount of cooling and massaging desired.

Other modifications of the invention will be apparent to those skilled in the art in light of the foregoing description. This description is intended to provide specific examples of individual embodiments which clearly disclose the present invention. Accordingly, the invention is not limited to these embodiments or the use of elements having specific configurations and shapes as presented herein. All alternative modifications and variations of the present invention which follow in the spirit and broad scope of the appended claims are included.

We claim:

1. A process for processing and treating pieces of meat, the meat having water, comprising:
   (a) placing the meat in a container having an interior cavity;
   (b) creating a vacuum in the interior cavity of the container, the vacuum being sufficient to lower, in the interior cavity, the temperature at which water boils so that water in the meat boils;
   (c) agitating the meat pieces while in the container;
   (d) exhausting the water vapor from the interior of the cavity; and
   (e) both cooling the massaging the meat pieces by means of the vacuum, wherein cooling is obtained by water boiling from the meat, thereby cooling the meat and massaging is obtained by expanding the meat when exposed to the vacuum and compressing the meat during agitation.

2. A process for processing the treating pieces of meat, the meat having water, comprising:
   (a) placing the meat in a container having an interior cavity;
   (b) creating a vacuum in the interior cavity of the container, the vacuum being sufficient to lower, in the interior cavity, the temperature at which water boils so that water in the meat boils, thereby cooling the pieces of meat and the interior cavity by vaporization of water;
   (c) agitating the meat pieces while in the container; and
   (d) exhausting the water vapor from the interior of the cavity.

3. A process for processing and treating pieces of meat, the meat having water, comprising:
   (a) placing the meat in a container having an interior cavity;
   (b) creating a vacuum in the interior cavity of the container, the vacuum being sufficient to lower the temperature at which water boils that water in the meat boils, thereby cooling the pieces of meat and the interior cavity by vaporization of water;
   (c) agitating the meat pieces while in the container;
   (d) exhausting the water vapor from the interior of the cavity; and
   (e) massaging the pieces of meat by means of the combination of the vacuum and agitating.

4. A process for processing and treating muscles of swine, the muscles having water, comprising:
   (a) placing the muscles in a container having an interior cavity;
   (b) creating a vacuum in the interior cavity of the container, the vacuum being less than 6.29 Torr and sufficient to lower the temperature inside the interior cavity to a temperature at which water in the muscles boils, thereby cooling the muscles and interior cavity by vaporization of water;

(c) agitating the muscles so as to expose various surfaces of the muscles while in the container;
(d) exhausting water vapor from interior of the cavity;
(e) massaging the muscles by alternately exposing various surfaces of the muscle to the vacuum by movement of the muscles due to the agitation; and
(f) increasing moisture retention of the muscles by the combination of the vacuum, temperature and massaging.

5. The process of claim 4, wherein said process increases moisture retention of the muscles, thereby extending shelf life of the muscles.

6. The process of claim 4, further comprising decreasing the cavities in the muscles by the combination of the vacuum, temperature and massaging.

7. A process for processing and treating pieces of meat, the meat having water, comprising:

(a) placing the meat in a container having an interior cavity;
(b) creating a vacuum in the interior cavity of the container, the vacuum being less than 6.29 Torr and sufficient to lower the temperature inside the interior cavity to a temperature at which water in the meat boils, thereby cooling the meat and interior cavity by vaporization of water;
(c) agitating the meat so as to expose various surfaces of the muscles while in the container;
(d) exhausting water vapor from the interior of the cavity;
(e) massaging the meat by alternately exposing various surfaces of the muscle to the vacuum by movement of the muscles due to the agitation; and
(f) increasing moisture retention of the meat by the combination of the vacuum, temperature and massaging.

* * * * *

UNITED STATES PATENT AND TRADEMARK OFFICE
CERTIFICATE OF CORRECTION

PATENT NO. : 4,942,053

DATED : July 17, 1990

INVENTOR(S) : Daniel L. Franklin, Arthur J. Goembel, Douglas D. Hahn

It is certified that error appears in the above-identified patent and that said Letters Patent is hereby corrected as shown below:

In column 5, please delete lines 5-9, and substitute the following:

$$\text{Therefore, } q = 33 \times \frac{359}{18} \times \frac{760}{4} \times \frac{492}{492} \times \frac{1}{60}$$

$$q = 2084 \text{ ACFM}$$

In column 7, line 33, please delete "PRM" and substitute therefore --RPM--.

In column 8, line 51, after "boils" and before "that", please insert --so--.

Signed and Sealed this

Twenty-sixth Day of November, 1991

*Attest:*

HARRY F. MANBECK. JR.

*Attesting Officer*  *Commissioner of Patents and Trademarks*